UNITED STATES PATENT OFFICE.

MAARTEN HOFSTÉ, OF AMSTERDAM, NETHERLANDS.

PRODUCTION OF TEXTILE FIBROUS MATERIAL.

1,345,776.  Specification of Letters Patent.  Patented July 6, 1920.

No Drawing.  Application filed January 2, 1920. Serial No. 349,050.

*To all whom it may concern:*

Be it known that I, MAARTEN HOFSTÉ, a subject of the Queen of the Netherlands, and residing at 712 Prinsengracht, Amsterdam, the Netherlands, have invented certain new and useful Improvements in and Relating to the Production of Textile Fibrous Material, of which the following is a specification.

The invention relates to the preparation of textile vegetable fibers from stalks or other parts of plants having a hard bast, such as rind or bast of trees and the like, as for instance, ramie. Hitherto such materials have been subjected to bio-chemical processes, retting, or to chemical processes in order to produce therefrom textile fibers. In the latter process the material is usually treated for a prolonged period with dilute alkali or alkali salts, e. g, sulfids, or with acids, by means of which the impurities in the cellulose are partly dissolved. The separation is often incomplete rendering necessary a subsequent mechanical separation. These processes are usually very prolonged and complicated as several baths must be used for the various chemicals which should be neutralized again and again. Further a mechanical treatment, e. g. with ramie, has been proposed which is laborious and expensive and has not given satisfactory results. The process of treating the stalks or other parts of plants, especially of plants with a hard woody rind or bast, according to the invention comprises producing within the vegetable material, by chemical means, a gas by which in addition to the chemical action to which the material is subjected a mechanical laying bare of the fiber is effected.

By the process according to my invention fibers may be obtained from the hitherto difficultly treated woody vegetable material, which fibers are easily spun and woven.

The raw materials are during a certain time subjected to the action of a boiling or not boiling aqueous solution of alkali, the concentration of which is regulated according to the nature of the material to be treated, upon which depend also the length of the treatment and the temperature.

Very concentrated lyes may be utilized of varying concentration, e. g. between 20 and 40%.

The material soaked with the alkali solution is subsequently put into a saturated solution of an ammonium salt (e. g. a 25% solution of ammonium chlorid) and boiled until the ammonia gas is completely driven off. This latter gas may be recovered.

Finally the material is washed with water which may be of boiling temperature and subsequently dried.

By treatment with the lye the glue substance and the intercellular substances are detached, whereas the inner layers of the vegetable material are impregnated with lye. In boiling with ammonium salt all the particles impregnated with lye are brought into contact with the boiling solution of ammonium salt, in consequence of which the ammonia gas formed in the nascent state is driven outward with great force, with the result that the hard bast is destroyed so that the fibers are wholly laid bare. Fibers may be obtained in this way with good results from very hard fibrous material.

While the invention is hereinbefore described in detail, it is to be understood that numerous variations may be made without departing from the spirit of the invention and from the scope of the claims.

I am aware of the fact that the simple use of the chemicals proposed is well known in itself and also that the use of several combinations of the said chemicals are known.

However up to now nobody has applied or described the effective combination of the successive steps which characterizes my invention as set forth in the claims and which combination of steps may be indicated as a mechanical process.

Having now described my invention what I claim as new and desire to secure by Letters Patent is:—

1. The process of preparing textile fibrous materials from stalks and other parts of plants especially of plants with a hard woody rind or bast, such as ramie, which comprises producing in the vegetable material a gas liberated by chemical reaction for causing a mechanical laying bare of the fibers.

2. The process of preparing vegetable textile fibers in which the vegetable material after being treated with lye is brought into a bath containing an ammonium salt and is boiled therein.

3. The process of preparing vegetable textile fibers in which the vegetable material after being treated with a 20 to 40% alkali lye is brought into a bath containing an ammonium salt and is boiled therein.

4. The process of preparing vegetable textile fibers in which the vegetable material after being treated with lye is brought into a bath containing 15–35% ammonium chlorid and is boiled therein.

5. The process of preparing vegetable textile fibers in which the vegetable material after being treated with a 20 to 40% alkali lye is brought into a bath containing 15–35% ammonium chlorid and is boiled therein.

6. The process of preparing vegetable textile fibers comprising the steps of boiling the vegetable material to be treated with alkali lye; bringing the material without washing it out in a bath of an ammonium chlorid solution; continuing the boiling until the ammonia gas is driven off and washing the fibrous material with water.

7. In a process for preparing vegetable textile fibers the boiling of the material to be treated in a bath of alkali lye and the subsequent boiling of the same in another bath containing an ammonium salt.

8. In a process of preparing vegetable fibers the treatment of the material to be treated with alkali lye and the subsequent boiling of the material in a bath containing about 25% of an ammonium salt.

In testimony whereof I affix my signature.

MAARTEN HOFSTÉ.

Witnesses:
D. KLIJN,
M. ALVARADO.